Figure 1:
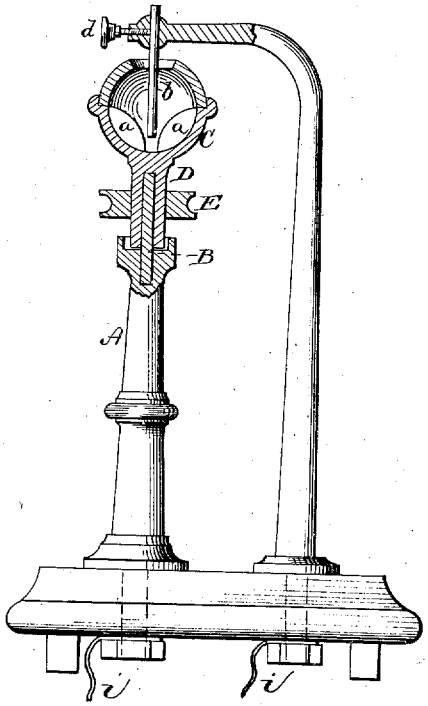

E. WESTON,

Assignor of one-half interest to Roberts & Havell.

DYNAMO ELECTRIC MACHINE.

No. 8,102. Reissued Feb. 26, 1878.

WITNESSES

Franck L. Durand

Frank Galt

INVENTOR

Edward Weston

Alexander Stuart

ATTORNEYS

UNITED STATES PATENT OFFICE.

EDWARD WESTON, OF NEWARK, NEW JERSEY, ASSIGNOR OF ONE-HALF INTEREST TO ROBERTS & HAVELL, OF SAME PLACE.

IMPROVEMENT IN DYNAMO-ELECTRIC MACHINES.

Specification forming part of Letters Patent No. 182,977, dated October 3, 1876; Reissue No. 8,102, dated February 26, 1878; application filed June 6, 1877.

*To all whom it may concern:*

Be it known that I, EDWARD WESTON, of Newark, in the county of Essex and State of New Jersey, have invented certain new and useful Improvements in Dynamo-Electric Machines; and I do hereby declare that the following is a full, clear, and exact description thereof, reference being had to the accompanying drawings, and to the letters of reference marked thereon, which form a part of this specification.

In electroplating by means of a current generated in a dynamo-electric machine, the direction of the current is liable to reversal when the rotation of the machine is arrested or considerably diminished in speed, because, under such circumstances, a return-current flows from the electrodes through the machine, and reverses the polarities of the electro-magnets. If the motion of the machine be then resumed, the current generated flows in the reversed direction, and removes from objects remaining in the plating-solution the metal which has been deposited upon them by the action of the original current. Thus the work done by a current flowing in one direction is undone by a current permitted to flow in the opposite direction. It will, hence, be seen that it is of great importance to insure persistency in the direction of the current generated by a dynamo-electric machine employed in electroplating or electrotyping. To secure this result is the primary object of my improvement; and to that end my invention consists in the combination, with a dynamo-electric machine and an electroplating-vat, of an adjustable switch, which automatically closes the circuit between the machine and the vat when the machine has acquired a given speed, or, concurrently with any given diminution in the strength of the current resulting from reduced speed of rotation of the dynamo-electric machine, automatically breaks the circuit of which the electroplating-vat forms a part, or, according to the mode in which it is arranged to operate, provides a path to a short circuit, through which the currents from the electrodes may flow until exhausted.

My invention also includes a switch of peculiar construction, adapted to the purpose indicated, and also to a variety of other purposes. This part of my invention consists, broadly, in a section of an electric circuit composed of a rotating mass of fluid, which is thrown and maintained in or out of the circuit, as the case may be, either by the preponderating action upon it of centrifugal force as against the force of gravity, or vice versa, the preponderance of either force being dependent upon and governed by the speed of rotation of the dynamo-electric machine with which the switch is combined.

Finally, my switch is adjustable, so that it can be arranged to perform its function at any given rate of speed of the dynamo-electric machine.

My invention therefore is to be considered in a twofold aspect—first, as exhibiting the combination of a dynamo-electric machine and an electroplating-vat with an automatic switch, acting concurrently with a given diminution in the strength of the current generated by the dynamo-electric machine, to prevent the reverse current from the electrodes in the vat from passing through the coils of the electro-magnets in the machine, and thereby reversing their polarities; and, secondly, as a fluid section of an electric circuit, which, dependently upon the speed of rotation of a dynamo-electric machine, is made to occupy different positions in or out of the circuit by being subjected to the preponderating effect of gravity in the one case, or, in the other case, to the preponderating effect of the centrifugal forces generated by its own rapid rotation.

In the accompanying drawings I have deemed it necessary to show only my improved switch, as both dynamo-electric machines and electroplating-vats are well known and in common use.

Figure 2:
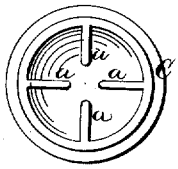

The drawings are as follows: Figure 1 is an elevation of my apparatus, showing the upper portion of it in central vertical section. Fig. 2 is a top view of a detached part of the apparatus.

The structure shown in the drawings consists of a vertical pillar, A, of brass, iron, or other conducting material, terminating at the top in a steel pin, B, which serves as the vertical axis or pivot upon which the cup C rotates. On the bottom of the cup is a stem or hub, D, recessed to admit the pin B, and provided with the pulley E, for the reception of a driving-belt leading from the shaft of a dynamo-electric machine, or from any other source of motion. The interior of the lower part of the cup is provided with the radially-arranged ribs or paddles *a a*, as shown in Fig. 2. A short distance from the pillar A is another pillar, G, the upper end of which is bent at or about a right angle, so as to project a little way over the center of the cup C, as shown in Fig. 1. A hole is drilled near the end of this pillar, in a line with the axis of the cup C, to receive the vertically-adjustable wire *b*, which is held in position by means of the set-screw *d*. The pillars A and G may be fastened in any suitable manner to a piece of wood or any other insulating material, or to the base of the machine. The wire *b* is cleaned and amalgamated with mercury, and a small quantity of mercury is poured into the cup C. The wire *b* is now adjusted so that it touches the mercury in the cup.

It is evident that as long as the cup C remains stationary the mercury will remain at the bottom, and the wire *b* and cup C will be in metallic connection; but if the cup C be rotated at a certain speed, the mercury will be thrown by centrifugal force away from the wire *b* radially outward and upward against the inner surface of the cup, and hence the connection between the wire and the cup will be broken.

Supposing, now, that the two wires *i i* from the machine are connected with this apparatus, one wire to each pillar, and the machine started, the current will flow up the pillar A, through the mercury, up the wire *b*, and down the pillar G to the other wire, and back again to the machine, thus completing the circuit. Under these conditions, what may be called the "short loop" of the circuit is closed; but if the cup C, containing the mercury, be caused to rotate by means of a belt running from the shaft of the machine, then it is obvious that when the machine, and consequently the cup, has reached a certain speed, the connection will be broken, thus opening the short circuit or short loop. If there is an outside conductor connected to the two pillars, the current, being no longer able to flow through the short loop of the circuit, will be diverted into and can flow through the external conductor, which may be called the "long loop" of the circuit. Conversely, when the machine, and consequently the cup C, falls to a certain speed, the connection between the cup and wire *b* will again be completed, and the current will cease to flow into the external conductor. If the external circuit includes an electroplating-vat, the reverse current from the vat, instead of flowing through the coils of the electro-magnets, is afforded a short circuit through the mercury, and, flowing through that, will soon be exhausted.

By a slight modification this apparatus may be made to close the circuit between the vats and the machine when the machine reaches a certain speed, and break it again when it falls below that speed. I prefer to do this in the case of large machines, which, when they are on closed circuit with small resistance, require considerable power to start them, and there is great danger of the belt running off before they reach the speed necessary to open the circuit and break the connection by the mercury rising and leaving the wire *b*. In this case it is necessary to use a wire with a disk of metal slightly smaller than the largest part of the inside of the cup C, so that when the cup revolves and the mercury rises it will touch the disk, and when it falls again the connection will be broken.

In order to use this arrangement it is necessary to connect one of the wires proceeding from the machine to one of the pillars, and the other pillar is to be connected to a binding-post, to which a wire leading from one of the electrodes of a vat may be attached. The other wire from the machine is connected directly to the other electrode in the vat, or, more conveniently, to a binding-post on the base of the machine, to which a wire may be attached at any time. With this arrangement the circuit between the machine and vat is not closed until the machine reaches a certain speed, which can be varied by raising or lowering the disk, and the connection is again broken before the machine falls below a certain speed, thus preventing the reverse currents from the vat passing around the electro-magnets and changing their polarity.

I do not limit myself to this particular device for opening or closing the circuit, as various arrangements, based upon the rotation of a mass or masses of metal, may be made to answer the same purpose. For instance, the mercury may be dispensed with, and a small governor, similar to those which are used for steam-engines, may be used. The balls, expanding and contracting at various speeds, may be made to open or close the circuit in various ways.

By a slight modification this or a similar arrangement may be directly attached to the shaft of the machine, instead of using a belt or other mode of transmitting the power.

It has heretofore been attempted to divert a current of electricity generated in a dynamo-electric machine from one circuit into another—as, for example, from a short circuit or short loop of a circuit into a long circuit or long loop of a circuit—by means of a movable armature, capable of forming a link or section of either circuit, and held in the short circuit by a spring or weight until withdrawn therefrom and placed in electrical connection with the long loop by the attraction of an electro-magnet excited by the current from the machine.

This contrivance, which was designed to effect the simultaneous ignition of a number of fuses, does not produce the effect of a switch in obliterating one path and permanently holding open another path, because, so soon as the armature forms an electrical connection with the longer circuit, the tension of the current, owing to its diversion into the longer circuit, is diminished, and the power of the electro-magnet is consequently so reduced that the magnet ceases to hold the armature in the long circuit. The armature flies back into the short circuit in obedience to the action of the spring upon it, and remains in the short circuit until the electro-magnet has again acquired sufficient power to attract and move it into the longer circuit. The result is a series of vibrations of the armature from one circuit to the other, producing currents alternately through the short loop and the long loop.

On the contrary, the function of my switch is to open or close a circuit, as the case may be, under given conditions, independently of any effect upon the switch itself of the current, which is shunted from one circuit into the other.

In electroplating there is necessarily variability in the resistance of the circuit, according to the variability in the number of objects suspended in the plating solution.

It will be seen that my invention performs its function without being affected by any variability in the strength of the current resulting from variability in the resistance of the circuit, because the power which operates my switch is derived from the mechanical force which operates the dynamo-electric machine.

I claim as my invention—

1. For use in combination with a dynamo-electric machine, a mechanical switch operated by a mechanical connection with the machine, or with the driving-power thereof, for automatically opening or closing an external electric circuit, and holding such circuit open or closed, according to the speed of the machine, substantially as described.

2. A dynamo-electric machine and an electroplating or electrotyping vat, respectively included in the same electric circuit, in combination with a short circuit, provided with an automatic switch, adapted to close the short circuit concurrently with any given diminution in the strength of the current resulting from a diminution in the speed of rotation of the dynamo-electric machine, for the purpose of providing a path through which the reverse current from the electrodes in the vat may flow without flowing through the machine.

3. A section of an electric circuit, composed of a rotating mass of fluid, adapted to occupy different positions in or out of the circuit, when subjected in the one case to the preponderating influence of gravity, or, in the other case, to the preponderating influences of the centrifugal forces generated by its own rotation.

4. In combination with a magneto-electric machine, a switch operated or controlled by means of a belt or other mode of transmitting power from a revolving shaft, and an adjustable wire or other piece of metal, the whole being arranged to open or close a circuit between the machine and an external conductor when the speed of the machine reaches a certain point.

In testimony that I claim the foregoing I have hereunto set my hand this 2d day of June, 1877.

EDWARD WESTON.

Witnesses:

FRANK GALT,

J. C. SCHROEDER.